United States Patent [19]

Asano

[11] Patent Number: 5,408,375
[45] Date of Patent: Apr. 18, 1995

[54] LOW-VIBRATION RETRACTION CAM FOR RECORDING/PLAYBACK APPARATUS

[75] Inventor: Isao Asano, Furukawa, Japan

[73] Assignee: Alps Electric Co., Ltd., Tokyo, Japan

[21] Appl. No.: 129,882

[22] Filed: Sep. 30, 1993

[30] Foreign Application Priority Data

Oct. 12, 1992 [JP]  Japan .................................. 4-273041

[51] Int. Cl.⁶ .............................................. G11B 5/54
[52] U.S. Cl. ..................................... 360/105; 360/104
[58] Field of Search ......................................... 360/105

[56] References Cited

U.S. PATENT DOCUMENTS 4,933,785  6/1990  Morehouse et al. .
5,341,260  8/1994  Jabbari ................................. 360/105

*Primary Examiner*—A. J. Heinz
*Attorney, Agent, or Firm*—Guy W. Shoup; Patrick T. Bever

[57]  ABSTRACT

The invention relates to a recording/playback apparatus, and more particularly to a recording/playback apparatus in which a cam member is provided to retract a transducer from the disk surface. The apparatus comprises a disk, a transducer, a support member for supporting the transducer, and a cam member. The cam member is formed into an arcuate shape in its half portion on the side coming into contact with the support member, and the remaining half portion of the cam member has an upper surface substantially flat.

3 Claims, 14 Drawing Sheets

LOW-VIBRATION RETRACTION CAM FOR RECORDING/PLAYBACK APPARATUS

BACKGROUND OF THE INVENTION

1. Field of the Invention

The present invention relates to a recording/playback apparatus in which a disk having a recording layer formed on its surfaces is rotatively driven to carry out recording or playback of information, and more particularly to a recording/playback apparatus in which a cam member is provided to retract a transducer from the disk in the event of a power failure or the like.

2. Description of the Related Art

As one conventional recording/playback apparatus, there is known a magnetic disk drive using, for example, the so-called hard disk which comprises a hard magnetic disk formed with a recording layer on its surface. In such a magnetic disk drive, the hard disk is rotated at a high speed and, by utilizing an air stream produced by the high-speed rotation over the hard disk surface, a magnetic head is floated by a small amount from the hard disk surface for writing or reading signals. In order to float the magnetic head with the aid of the air stream, it is required to obtain a rotational speed enough to produce a floating force. If the sufficient rotational speed is not obtained, the magnetic head would bump against the hard disk, resulting in damage of the hard disk or the magnetic head. Then, if the hard disk is damaged, the information stored in the damaged area of the hard disk would be lost, and if the magnetic head is damaged, the magnetic disk drive could be no longer used. In any case, a serious problem would be resulted.

The above head crash may occur not only due to vibrations or shocks, but also when electric power supplied to a spindle motor for rotatively driving the hard disk is cut off upon a power failure or other troubles. In view of the above, there have hitherto been proposed various magnetic disk drives each of which has an auto-retracting mechanism for retracting a magnetic head from a hard disk when electric power supplied to a spindle motor is cut off.

An auto-retracting mechanism generally employed in recent years is of the type that a magnetic head moving device is driven by utilizing the back electromotive force produced with inertial rotation of a spindle motor. This type mechanism is advantageous in making the structure not complicated and reducing power consumption. It is also considered to be advantageous to provide a cam member formed with a cam surface for guiding retract movement of a magnetic head and cause the magnetic head to move over the cam member for thereby surely departing the magnetic head from the hard disk when retracted, because this technique provides high reliability with the smaller number of parts.

In the prior art, the cam member was cylindrical in shape for the purpose of reducing a frictional force between the cam member and a load arm of the magnetic head.

Referring to FIGS. 16(a) and 16(b), denoted by 60 is an upper mold, 61 is a lower mold, 62 is a cavity, 63 is a space into which a movable mold (not shown) is inserted, 64 is a cam member for one disk, 64a is a cam portion for an upper magnetic head, 64b is a cam portion for a lower magnetic head, 65 is a cam surface, and 66 is a parting line.

When manufacturing the cam member 64 for one disk, the cam member 64 is separated at its middle line into the cam portion 64a for the upper magnetic head and the cam portion 64b for the lower magnetic head and, correspondingly, a mold is divided into the upper mold 60 and the lower mold 61, as shown in FIG. 16(a). Therefore, the joined surface between the upper mold 60 and the lower mold 61, i.e., the parting line 66, appears at the center of a lateral surface of the molded cam member 64 for one disk, as shown in FIG. 16(b). Accordingly, even if the shape of the cam member 64 is changed as a result of removing burrs produced along the parting line 66, no effect has been caused in a specific part function of the cam member.

A description will now be given on a cam member for two disks.

Referring to FIGS. 16(c) and 16(d), denoted by 67 is a first mold, 68 is a second mold, 69 is a first cavity, 70 is a second cavity, 71 is a space into which a movable mold (not shown) is inserted, 72 is a cam member for an upper disk, 72a is a cam portion for an upper magnetic head, 72b is a cam portion for a lower magnetic head, 73 is a cam member for a lower disk, 73a is a cam portion for an upper magnetic head, 73b is a cam portion for a lower magnetic head, and 74 is a cam surface.

In the cam member for two disks, as shown in FIG. 16(d), the cam member 72 for the upper disk and the cam member 73 for the lower disk are integrally molded. When the cam member for two disks is molded by using a mold comprised of split molds in the necessary lowest number from the necessity of making manufacture of the mold easy, the mold is divided into the first mold 67 and the second mold 68 along a plane penetrating the centers of the two cam members 72, 73.

In the case of molding the cam member for two disks by those first and second molds 67, 68, however, the parting line 66 appears at the centers in upper surfaces of the cam portions 72a, 73a and at the centers in lower surfaces of the cam portions 72b, 73b. Accordingly, the shape of the cam member is changed after removing burrs produced along the parting line 66. This results in a failure of head retracting operation, thereby causing an adverse effect on a specific part function of the cam member.

Referring to FIGS. 17 to 19, denoted by 75 is a cam member, 76 is a cam portion for an upper magnetic head, 77 is a cam portion for a lower magnetic head, 78 is a cam surface, 79 is a top of the cam surface, 80, 81 are slopes of the cam surface, and 82 is a load arm for supporting the magnetic head.

When the auto-retracting operation is effected upon a power failure or other reasons, the load arm 82 of the upper magnetic head is moved toward the outer periphery side of a hard disk and then strikes against the slope 80 of the cam surface 78 of the cam portion 76, as shown in FIGS. 17 and 18. (Note that while the operation of retracting the upper magnetic head only is shown and explained in the figures and the description, the similar operation is performed for the lower magnetic head as well). In the auto-retracting operation, the load arm 82 strikes against the slope 80 of the cam surface 78 at a predetermined speed, ascends the slope 80 and passes over the top 79, and then reaches a position indicated by one-dot-chain lines in FIGS. 17 and 18 before it is held in that position. After that, when the apparatus is driven again upon restoration from an abnormal condition, the load arm 82 is moved in a direction opposite to that in the retracting operation (toward the center of the hard disk); i.e., it ascends the slope 81, passes over the top 79, and then comes back to a recording zone on the hard disk.

The slopes 80, 81 of the load arm 82 are formed, as shown in FIG. 17, such that an angle $\theta_1$ of inclination of the slope 80 on the side near a distal end of the load arm 82 is smaller than an angle $\theta_2$ of inclination of the slope 81 on the opposite flank side near a proximal end of the load arm 82. Therefore, when the load arm 82 passes over the top 79 in the auto-retracting operation, it jumps downwardly as shown in FIG. 18. Such a jump causes the load arm 82 to vibrate upon landing on the cam member 75. This vibration further causes a slider (magnetic head) to vibrate, which is attached to the distal end of the load arm 82 through a flexure as shown in FIG. 19, thereby damaging the flexure. Also, during the head loading in which the load arm is moved in the opposite direction, the load arm 82 strikes against the slope 81, whereupon the slider may vibrate. This accompanies a risk that the hard disk may be damaged when the slider is loaded back to the hard disk.

FIG. 22 is an explanatory view showing the relationship between the cam member for the upper magnetic head and the cam member for the lower magnetic head of the conventional cam member. Note that for convenience of description, the cam member for the lower magnetic head is illustrated upside down. In the prior art, as shown in FIG. 22(a), cam surfaces 85, 86 of cam portions 83, 84 have the same shape for the upper and lower cam members. When the retracting operation is effected, the load arms 82 moves over slopes 87, tops 88 and slopes 89 of the cam portions 83, 84, respectively, as explained above. Forces F necessary for the retracting operation of the load arm 82 are given, respectively, when the load arm is loaded and unloaded, as shown in FIG. 22(b). Because the cam surfaces 85, 86 associated with the upper and lower magnetic heads have the same shape, the forces F necessary for the refracting operation of the respective load arms 82, 82 are changed while drawing curves which undulates at the same timing. Therefore, these forces are combined with each other so that a maximum force F necessary for moving over the tops 88 becomes large. Particularly, when the number of hard disks is increased, the necessary maximum force F is enlarged. As a result, a large drive force is required for retracting the load arms 82.

As shown in FIGS. 20(a) and 20(b), the load arm 30 has side plates 30a, 30a formed by folding both side edges thereof, and the flexure 31 having the flat form is fixed to the load arm 30 as it is. Then, in the prior art, the cam member 32 is disposed in such a position as to strike against a distal end portion of the load arm 30, as shown in FIG. 20(a). With such an arrangement, the load arm 30 is lifted off the hard disk by the cam member 32 at a position offset from the center of the load arm 30, causing a force which acts on the load arm 30 to twist it. Thus, as shown in FIG. 21, there has accompanied a fear that the slider (magnetic head) mounted at the distal end of the load arm 30 (i.e., the flexure 31) moves toward and away from the hard disk in a tilted posture, and undesired vibration may be produced to damage the hard disk or disable accurate read/write of signals. With a view of solving this problem, if the cam member 32 is changed in its position of arrangement so as to strike against the flexure 31, the distance by which the striking position is offset from the center of the load arm 30 would be reduced and the load arm 30 would be not significantly twisted. By so arranging the cam member 32, however, since the load arm 30 has a stepped portion 33 formed between the side edge of the flexure 31 and the side edge of the load arm 30 in a position where the cam member 32 would now strike against the load arm 32, the cam member 32 would be moved in slide contact with the stepped portion 33 when retracted, making it difficult to perform the smooth retracting operation due to such reasons as variations in slide resistance.

SUMMARY OF THE INVENTION

A first object of the present invention is to provide a recording/playback apparatus having a cam member which is not affected in its specific part function even with a change in shape after removing burrs, which can be adapted for a plurality of disks, and further which can be molded by using molds of simple structure.

A second object of the present invention is to provide a recording/playback apparatus in which a load arm is not vibrated during loading or unloading, and read or write of signals can be accurately performed.

A third object of the present invention is to provide a recording/playback apparatus in which peaks of forces necessary for driving a plurality of load arms are distributed to reduce a necessary maximum force during loading or unloading, and the load arms can be positively loaded or unloaded.

A fourth object of the present invention is to provide a recording/playback apparatus in which even when a cam member is arranged in such a position as striking against a flexure so that the cam member strikes against a side edge of the flexure upon the latter being retracted, but the cam member does not strike against a side edge of the load arm, to thereby enable the smooth retracting operation.

With the present invention, the portion of the cam member over which the support member slides is formed into an arcuate shape and, therefore, a friction force produced between those two members is so reduced as to reliably carry out the retracting operation. Also, since the cam surface is arcuate only in its half portion and the remaining half portion is flat, even a cam member adaptable for a plurality of disks can be molded by using a simple mold and a parting line appears in the area of the cam member except for the cam surface.

Further, with the present invention, the support member having passed over the top of the cam member soft-lands on the back-side slope and, therefore, undesired vibration is not produced after the support member has passed over the top.

Additionally, with the present invention, the peak timings of forces necessary for driving a plurality of support members are shifted from each other to make the peaks distributed. Therefore, the magnitude of each peak can be held down at a relatively small value.

Moreover, with the present invention, even when the cam member is in such a position as striking against the flexure so that the cam member strikes against a side edge of the flexure during the retracting operation, a side edge of the support member is covered by the side edge of the flexure. Accordingly, the cam member does not strike against the side edge of the support member, enabling the support member to be smoothly loaded or unloaded.

DETAILED DESCRIPTION OF THE PREFERRED EMBODIMENTS

Figure 1:
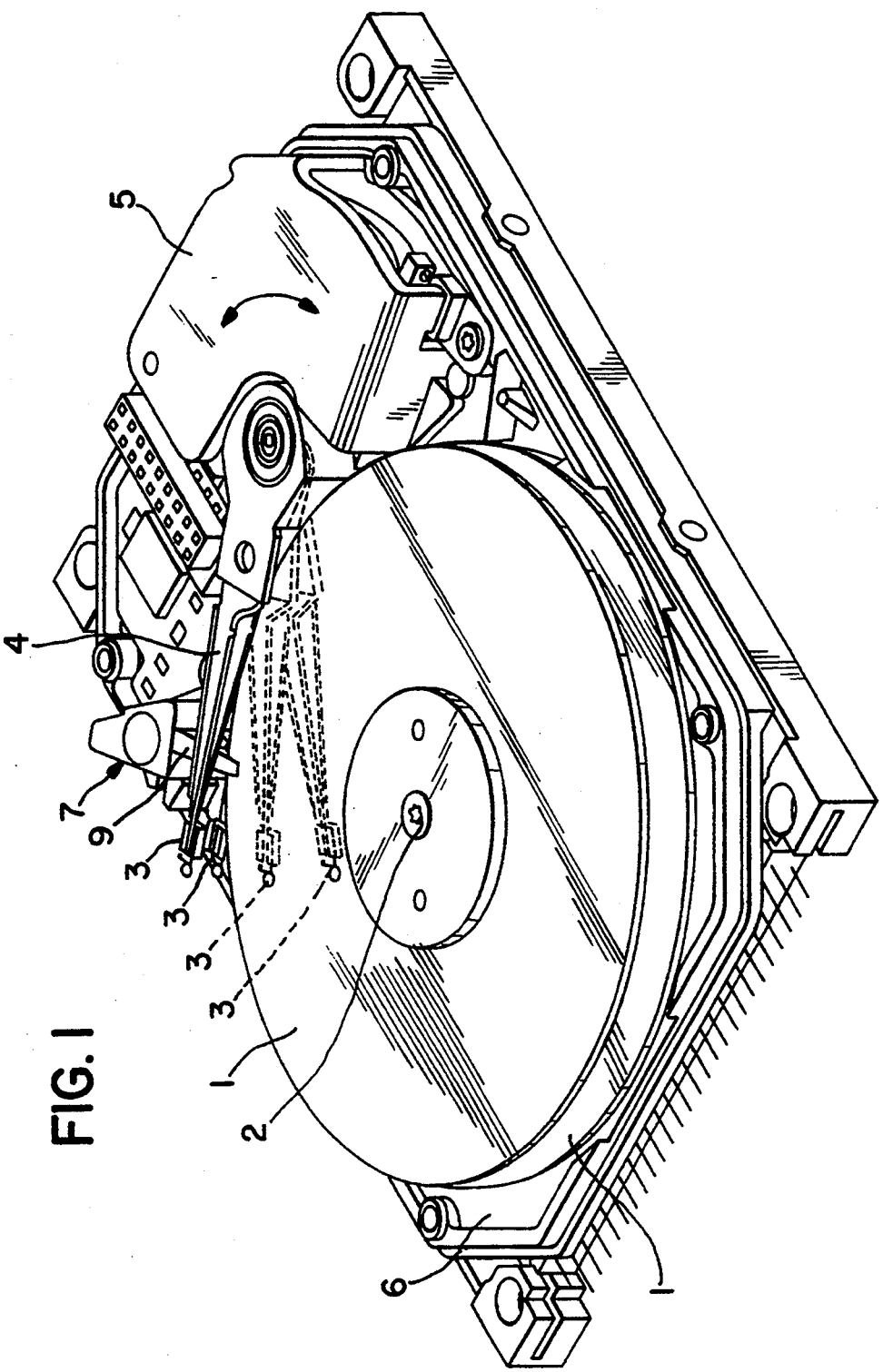
FIG. 1 is a perspective view showing the entire construction of a recording/playback apparatus according to a first embodiment of the present invention.

Hereinafter, the present invention will be described in connection with a magnetic disk drive as an example embodying a recording/playback apparatus to which the invention is applied.

Referring now to FIGS. 1 to 7, a hard magnetic disk (hereinafter referred to simply as a hard disk) 1 is screwed to a rotary shaft 2 which is integral with a rotor of a spindle motor, so that the hard disk is rotated together with the rotor. In the illustrated first embodiment, two hard disks 1 are fixed to the rotary shaft 2. A magnetic head 3 for writing or reading signals into or from a magnetic recording layer formed on the surface of the hard disk 1 is supported by a voice coil motor (hereinafter abbreviated as VCM) through a load arm 4. By turning the VCM 5 in directions of arrows in FIG. 1, the magnetic head 3 is moved to and back from a desired recording track in a radial direction of the hard disk 1. The magnetic head 3 is disposed to face the magnetic recording layer on each of both the surfaces of the hard disk 1. When the hard disk 1 is rotated at a high speed through the rotary shaft 2, the magnetic heads 3 are each floated by a small amount from the surface of the hard disk 1 with an air stream acting against a spring force of the load arm 4.

Figure 2A:
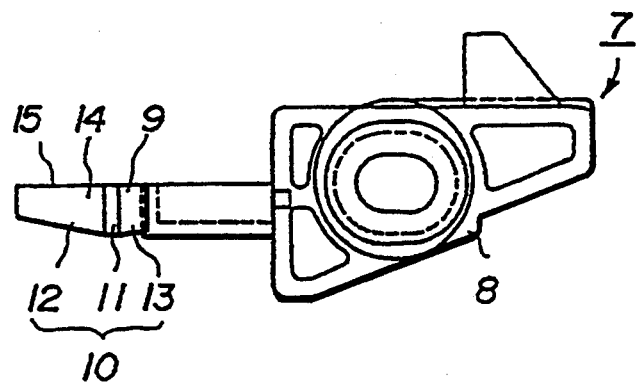
FIGS. 2(a), 2(b) and 2(c) are a plan, vertical sectional and rear view, respectively, of a cam member of the recording/playback apparatus according to the first embodiment of the present invention.
Figure 2B:
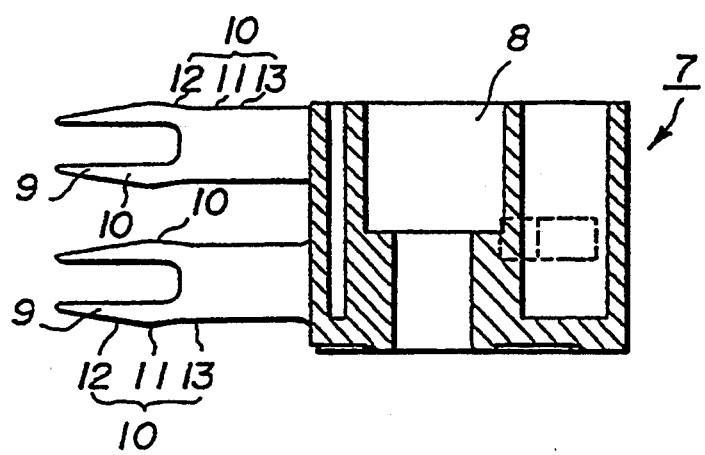
Figure 2C:
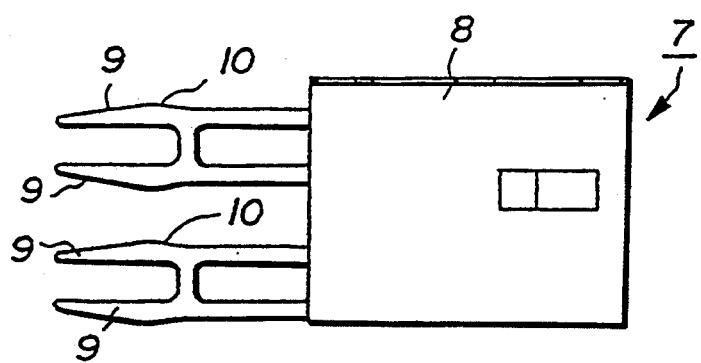

On the other hand, a cam member 7 fixed to a chassis 6 is disposed near an outer peripheral edge of the hard disk 1. As shown in FIGS. 2(a) to 2(c), the cam member 7 is projected from a lateral surface of a mount base 8 and mainly comprises cam portions 9, 9, 9, 9 corresponding to both sides of the two disks 1, 1 and cam surfaces 10 formed on the respective surfaces of those cam portions 9.

Figure 3A:
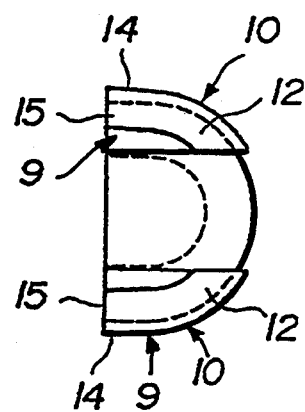
FIGS. 3(a) and 3(b) are a front and side view, respectively, of essential parts of the cam member of the recording/playback apparatus according to the first embodiment of the present invention.
Figure 3B:
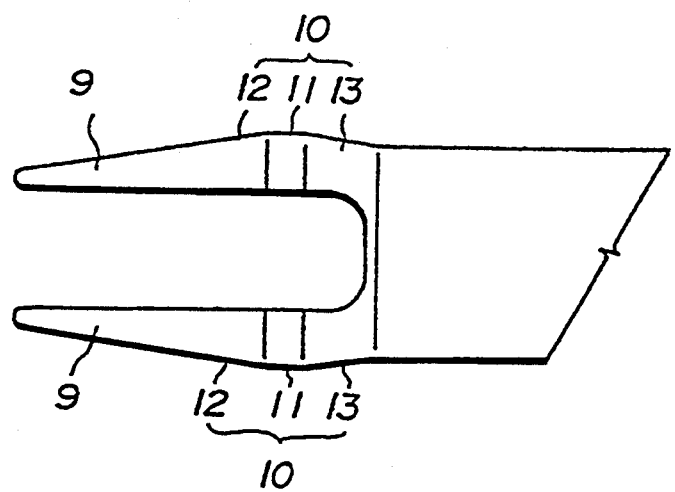

The cam surface 10 of each cam portion 9 includes, as shown in FIG. 3(b), a top 11, a slope 12 extending downwardly from the top 11 toward a distal end, and a slope 13 extending downwardly from the top 11 toward the side opposite to the slope 12. Also, the cam surface 10 of each cam portion 9 is formed into an arcuate shape substantially in its right-hand half (on the same side as a base of the load arm 4 in a condition that the cam member 7 is fixed to the chassis 6), as shown in FIG. 3(a). A maximum thick portion (corresponding to the central portion in the prior art) of the cam surface 10 provides a flat surface portion 14 inclined at a small gradient necessary for releasing from a mold, and a left-hand end 15 of the flat surface portion 14 defines a vertical flat surface.

A description will now be given on a method of molding the cam member 7 configured as explained above.

Figure 4:
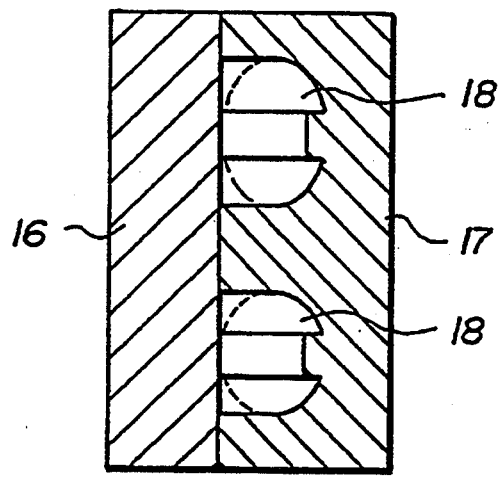
FIG. 4 is an explanatory view showing a mold for manufacturing the cam member of the recording/playback apparatus according to the first embodiment of the present invention.

To first describe a mold, as shown in FIG. 4, the mold comprises a first mold 16 and a second mold 17 which are separable along a vertical parting plane, as well as a movable mold (not shown). The first and second molds 16, 17 are fastened together to define cavities 18, 18. Each cavity 18 is provided by making a joining surface of the first mold 16 flat and forming a recess in a joining surface of the second mold 17.

The cam member 7 is molded as follows. In a fastened condition of the molds as shown in FIG. 4, a molten resin is injected to fill the cavities 18. Then, after solidification by cooling, the molds are opened and released to thereby obtain the cam member 7 as shown in FIGS. 2(a) to 2(c).

Operation of the magnetic disk drive of the first embodiment thus constructed will be described below.

When electric power supplied to a spindle motor is cut off during operation of the magnetic disk drive upon a power failure or other troubles, the stop of the electric power supplied is detected by detecting means and switching means is changed over so that the back electromotive force produced with inertial rotation of a rotor of the spindle motor is transmitted to the VCM 5 through rectifying means. The VCM 5 is thereby driven to move each magnetic head 3 toward the outer peripheral side of the hard disk 1 in a radial direction. As the load arm 4 having reached the cam surface 10 of the cam portion 9 slides over the slope 12, the magnetic head 3 is gradually spaced from the surface of the hard disk 1. Then, the load arm 4 passes over the top 11, thereby ending the retracting operation.

Figures 5A, 5B:
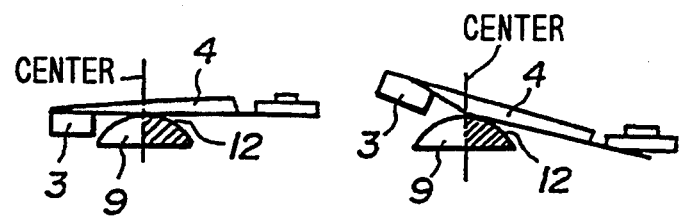
FIGS. 5(a) and 5(b) are explanatory views showing contact conditions between a transducer support member and the cam member of the recording/playback apparatus according to the first embodiment of the present invention.
Figure 6A:
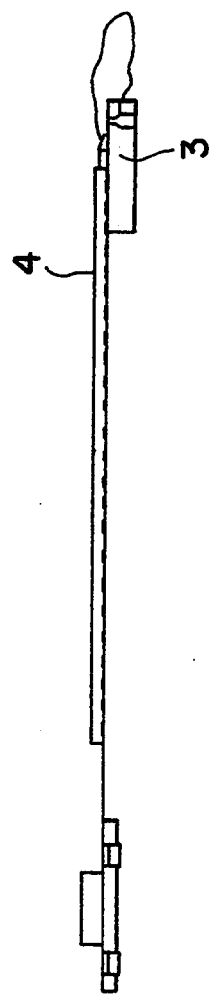
FIGS. 6(a) and 6(b) are a plan and front view, respectively, of the support member, to which a transducer is mounted, in the recording/playback apparatus according to the first embodiment of the present invention.
Figure 6B:
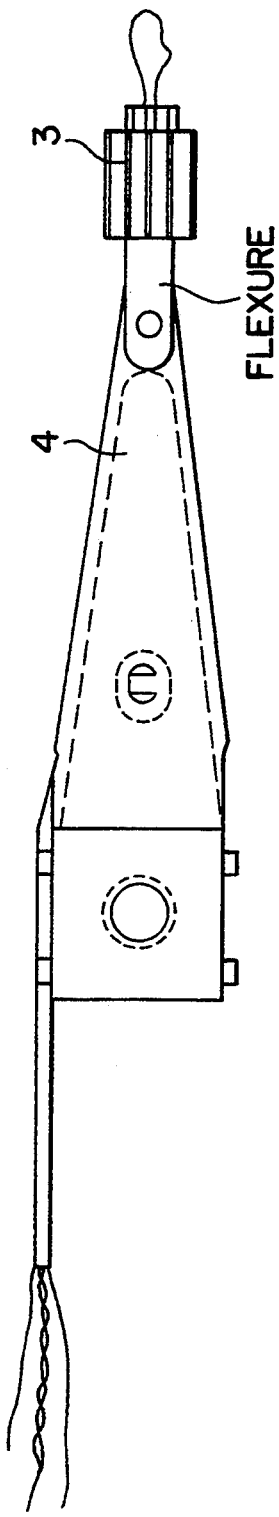

In the above retracting operation, the load arm 4 slides over the cam portion 9 as follows. When the load arm 4 first strikes against the slope 12 of the cam portion 9, it lies horizontally as shown in FIG. 5(a). But, as the retracting operation goes on and the load arm 4 moves over the slope 12 of the cam portion 9, the load arm 4 is inclined with the side of the magnetic head 3 lifted, as shown in FIG. 5(b). In this inclined condition, the contact point between the load arm 4 and the cam surface 10 of the cam portion 9 is shifted to the right side (in FIG. 5) from the center of the cam portion 9. Accordingly, with the arrangement of this first embodiment that the cam surface 10 is formed only in the right half of the cam portion 9, there cause no problems in the retracting operation of the load arm 4.

Figure 7:
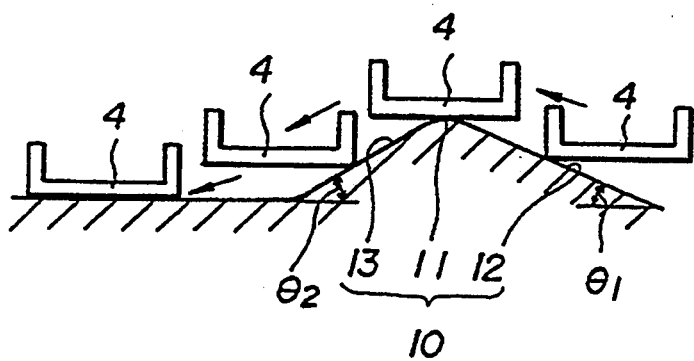
FIG. 7 is an explanatory view showing a retracting operation with the aid of the cam member of the recording/playback apparatus according to the first embodiment of the present invention.
Figure 18:
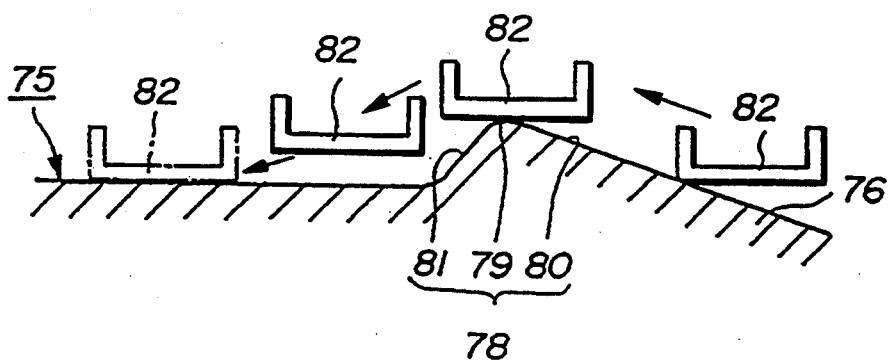
FIG. 18 is an explanatory view showing a retracting operation of a transducer in a recording/playback apparatus using the cam member of prior art.
Figure 19:
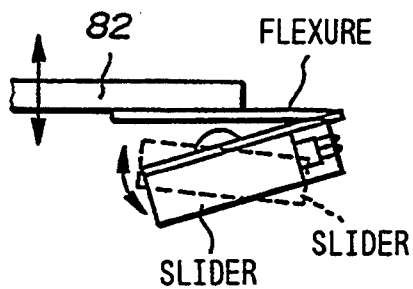
FIG. 19 is an explanatory view showing vibration of a slider during the retracting operation of the transducer with the aid of the cam member of prior art.
Figure 20A:
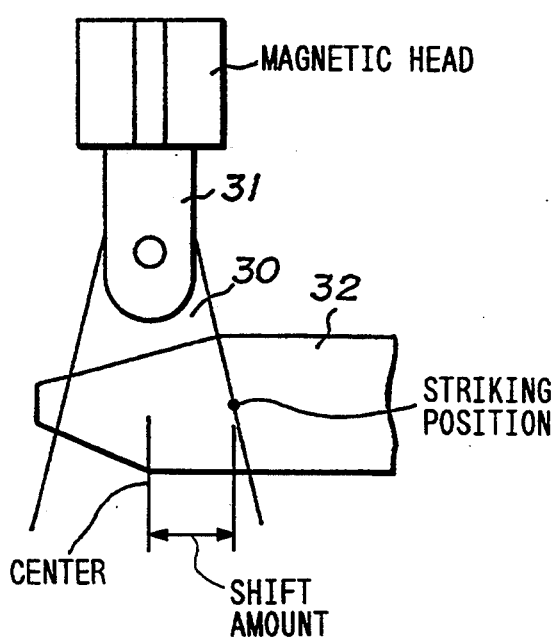
FIGS. 20(a) and 20(b) are explanatory views showing the relationship among a transducer support member, a flexure and the cam member of prior art.
Figure 20B:
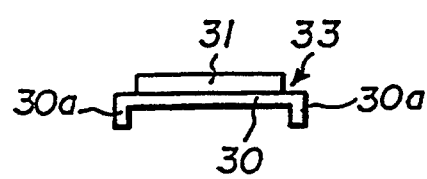
Figure 21:
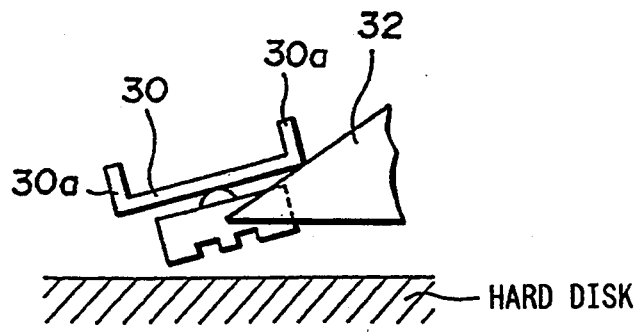
FIG. 21 is an explanatory view of the transducer support member of prior art.
Figure 22A:
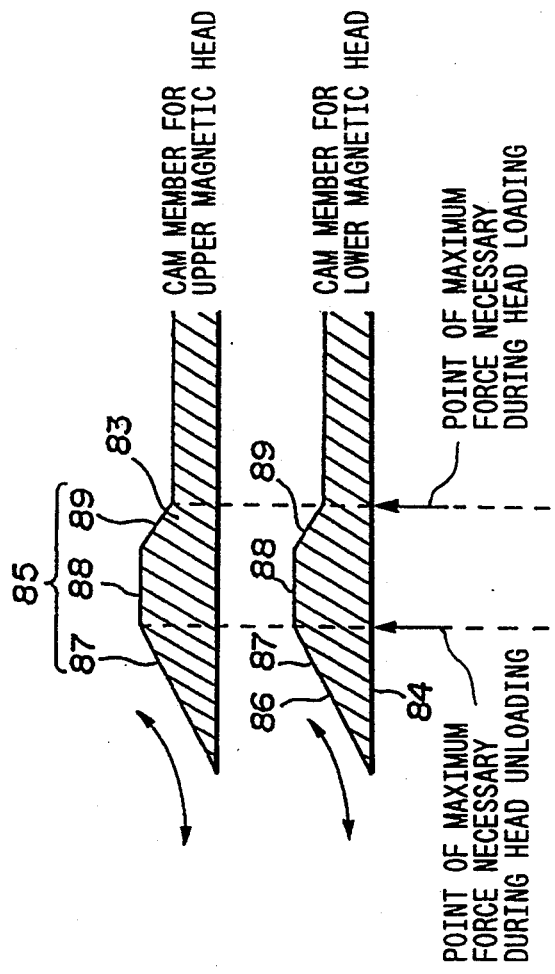
FIGS. 22(a) and 22(b) are explanatory views showing the positional relationship between upper and lower cam members and the timed relationship between forces for driving upper and lower transducer support members, respectively.
Figure 22B:
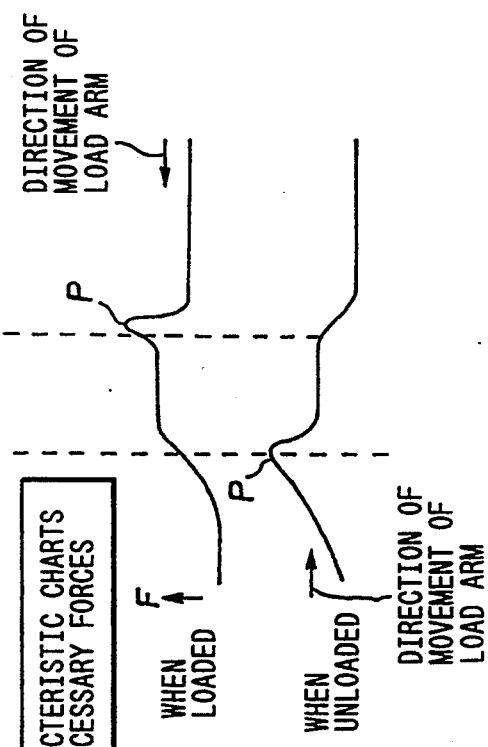

Further, the cam member 9 is formed, as shown in FIG. 7, such that an angle $\theta_1$ of inclination of the slope 12 is equal to an angle $\theta_2$ of inclination of the slope 13 (($\theta_1 = \theta_2 = 9°$ in this embodiment). In the retracting operation, therefore, after the load arm 4 strikes against the cam portion 9 and ascends the slope 12, it passes over the top and descends the slope 13 while keeping contact therewith, as shown in FIG. 7. As a result, unlike the prior art shown in FIG. 18, the load arm does not jump and land on the cam member 9; hence the load arm is prevented from vibrating.

Thus, with the above first embodiment, since the load arm 4 having passed over the top 11 soft-lands on the backside slope 13, neither shock nor vibration are generated upon the landing of the load arm so that the magnetic head can be smoothly loaded or unloaded.

A second embodiment of the recording/playback apparatus according to the present invention will be described with reference to FIG. 8.

Figure 8A:
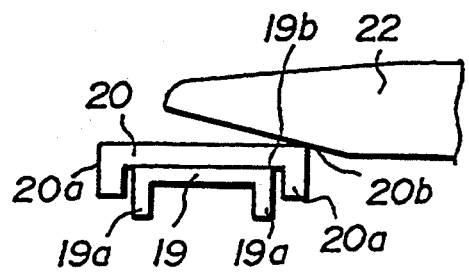
FIGS. 8(a) and 8(b) are a vertical sectional and plan view, respectively, showing the relationship among a cam member, a transducer support member and a flexure of a recording/playback apparatus according to a second embodiment of the present invention.
Figure 8B:
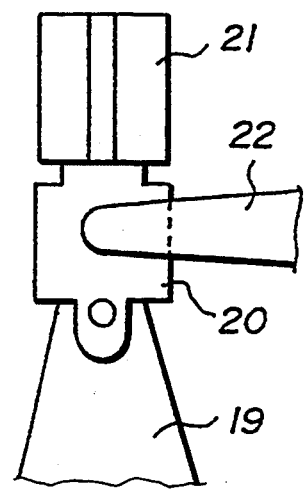

In FIG. 8, denoted by 19 is a load arm, 20 is a flexure fixed to a distal end of the load arm 19 by caulking, spot welding or the like, 21 is a slider (magnetic head) attached to flexure 20, and 22 is a cam portion. The load arm 19 is tapered toward the distal end, as shown in FIG. 8(b), and has side plates 19a, 19a formed by folding both side edges thereof. The flexure 20 also has side plates 20a, 20a formed by folding both side edges thereof. The side plates 20a, 20a of the flexure 20 are positioned outwardly of the side plates 19a, 19a of the load arm 19. As shown in FIG. 8(a), therefore, even with the cam portion 22 disposed in such a position as striking against the flexure 20, the cam portion 22 strikes against only a side edge 20b of the flexure 20, but not a side edge 19b of the load arm 19 during the retracting operation because the side edge 19b of the load arm 19 is covered by the side edge 20b of the flexure 20. Consequently, the load arm 19 can be smoothly loaded or unloaded.

A third embodiment of the recording/playback apparatus according to the present invention will be described with reference to FIG. 9.

In FIG. 9, denoted by 35.is a load arm, 36 is a slider attached to a distal end of the load arm 35 through a flexure (not shown), and 37 is a cam portion.

Figure 9A:
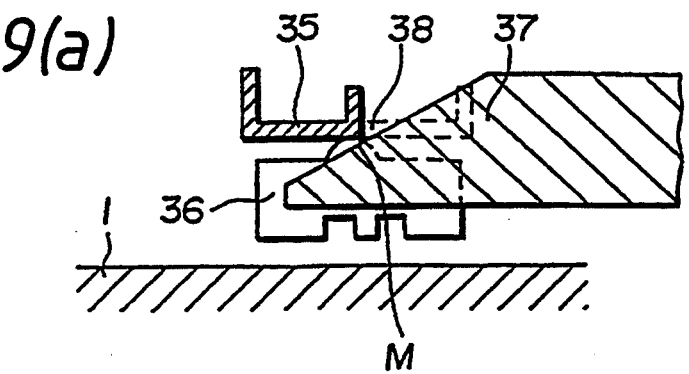
FIGS. 9(a) and 9(b) are a vertical sectional and plan view, respectively, showing a transducer support member of a recording/playback apparatus according to a third embodiment of the present invention.
Figure 9B:
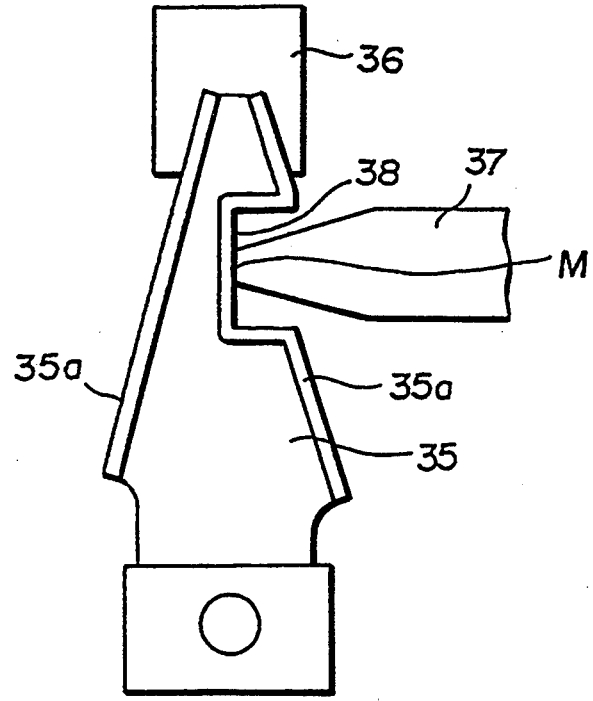

The load arm 35 is tapered toward the distal end, as shown in FIG. 9(b), and has side plates 35a, 35a formed by folding both side edges thereof. Also, the load arm 35 is cut in from the side edge near the cam portion 37 to provide a cut-out recess 38 which extends until the center of the load arm 35. As shown in FIG. 9(a), therefore, when the cam member 37 strikes against an inner edge of the cutout recess 38 upon the load arm 35 being loaded or unloaded, a striking position M between the cam member 37 and the load arm 35 locates at the center of the load arm 35. Accordingly, even when a force for making the magnetic head 3 away from or toward the hard disk 1 acts on the load arm 35 during the unloading or loading, the load arm 35 is not twisted so that it is smoothly loaded or unloaded.

A fourth embodiment of the recording/playback apparatus according to the present invention will be described with reference to FIGS. 10 and 11.

Figure 11:
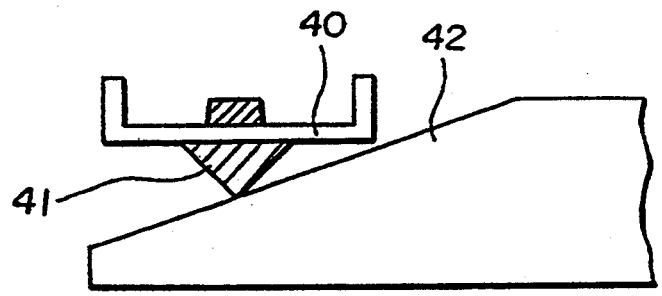
FIG. 11 is a vertical sectional view of essential parts of a prior art for comparison with the fourth embodiment shown in FIG. 10.

As shown in FIG. 11, a plastic-made projection 41 is integrally formed at the center of a load arm 40 in the prior art. In the retracting operation, the load arm 40 does not directly contact a cam portion 42, but the projection 41 contacts the cam portion 42. With such a construction, the retracting operation could be performed without twisting the load arm 40, but the production cost was increased for the reason that the projection 41 had to be molded as a different part from the load arm 40.

Figure 10:
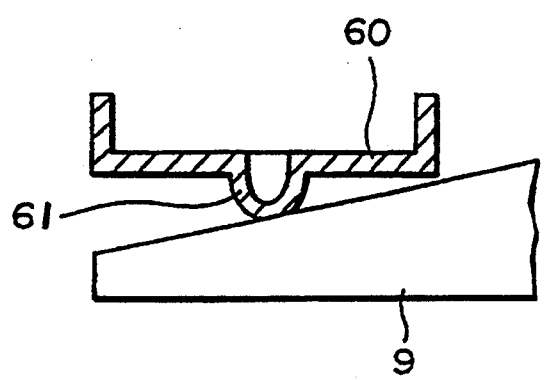
FIG. 10 is a vertical sectional view of essential parts of a recording/playback apparatus according to a fourth embodiment of the present invention.

In view of the above, as shown in FIG. 10, a boss 61 is integrally formed by drawing at the center of a load arm 60 in a position facing the cam member 9 in this embodiment. In the retracting operation, the boss 61 of the load arm 60 contacts the cam portion 9, as shown in FIG. 10.

A fifth embodiment of the recording/playback apparatus according to the present invention will be described with reference to FIG. 12.

Figure 12A:
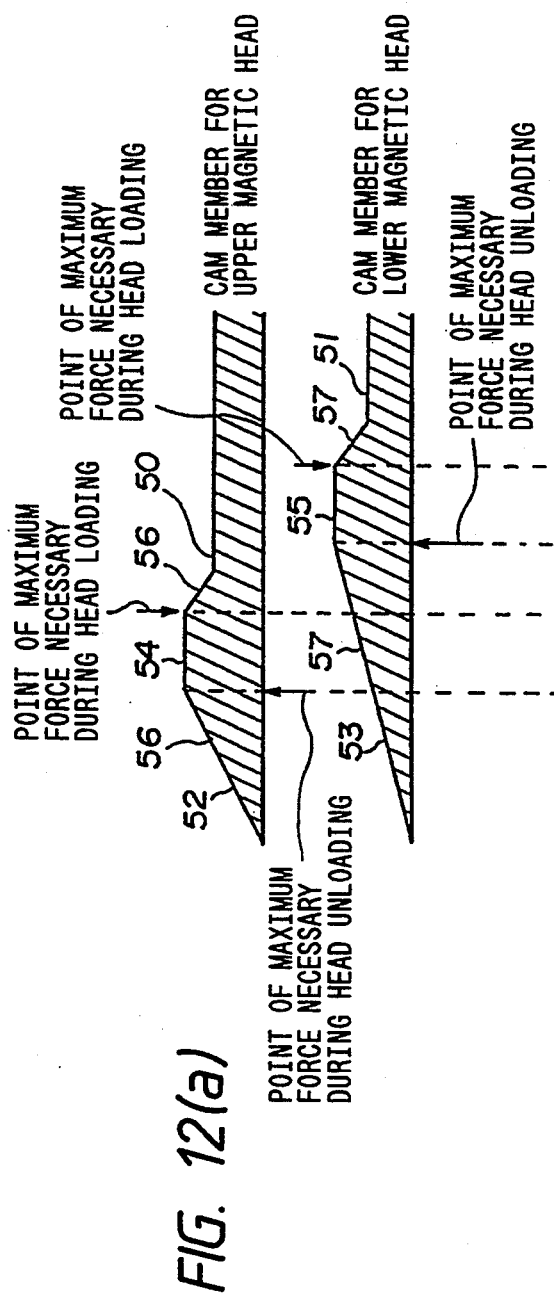
FIGS. 12(a) and 12(b) are explanatory views showing the positional relationship between upper and lower cam members and the timed relationship between forces for driving upper and lower transducer support members, respectively, in a recording/playback apparatus according to a fifth embodiment of the present invention.

In this embodiment, as shown in FIG. 12(a), a cam member 50 for an upper magnetic head and a cam member 51 for a lower magnetic head have respective cam surfaces 52, 53 different in shape from each other. (Note that for convenience of description, the cam member for the lower magnetic head is illustrated upside down.) More specifically, the cam surface 52 of the cam member 50 for the upper magnetic head has its top 54 located at a position nearer to a distal end of the cam member 50, and the cam surface 53 of the cam member 51 for the lower magnetic head has its top 55 located at a position farther from a distal end of the cam member 51, so that both the tops 54, 55 are shifted from each other. Denoted by 56, 57 are slopes of the cam members 50, 51.

Figure 12B:
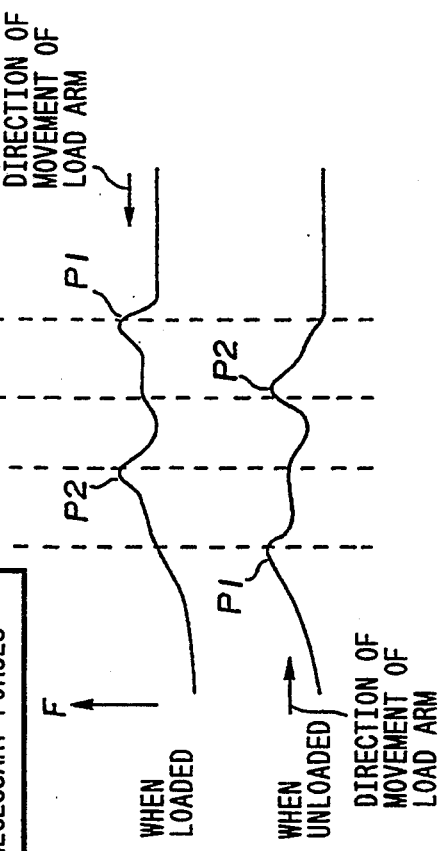

FIG. 12(b) is an explanatory view showing a resultant of forces necessary for moving the upper and lower load arms 4, 4. As will be seen from FIG. 12(b), during the retracting operation (i.e., the unloading operation), when the load arm 4 of the upper magnetic head and the load arm 4 of the lower magnetic head moves over the slopes 56, 57 of the cam members 50, 51, the necessary force F is gradually increased and provides a first peak $P_1$ at the time the load arm 4 of the upper magnetic head reaches the top 54 of the cam member 50. When the load arms 4, 4 are further moved outwardly in the radial direction, the force necessary for moving the load arm 4 of the upper magnetic head is reduced after passing over the top 55, but the necessary force F provides a second peak $P_2$ at the time the load arm 4 of the lower magnetic head reaches the top 55 of the cam member 51. Thus, in this fifth embodiment, since the timings when the load arms 4, 4 passes over the tops 54, 55 of the cam members 50, 51, respectively, are shifted from each other, the peaks P are distributed to reduce the force F necessary at the peaks $P_1$ and $P_2$. Accordingly, the necessary maximum force F during the loading or unloading operation can be reduced so that the load arms are reliably loaded or unloaded. If the cam surfaces 52, 53 are shifted in their positions, the data zone on the hard disk 1 would be reduced. From the standpoint of practical use, it is therefore preferable to shift only the slopes 56, 57 from each other. In the case of shifting the slopes 56, 57 in any one side, the necessary force F can be reduced during either loading or unloading only, but this is also sufficiently advantageous for practical use. The similar advantage could be resulted by shifting the magnetic heads 3, 3 from each other. It has, however, proved that shifting the magnetic heads 3, 3 would be disadvantageous in points of reducing the data zone on the hard disk 1 and increasing the length of the cam member.

While the embodiment shown in FIG. 12 has been described in connection with the relationship between the cam member for the upper magnetic head and the cam member for the lower magnetic head for one hard disk 1, the present invention is not limited thereto, but also applicable to an apparatus in which an upper magnetic head and a lower magnetic head are associated with each of a plurality of hard disks 1, . . . , by making the timings different at which load arms 4, . . . pass over tops of respective cam members.

The fifth embodiment is further advantageous in that if tops of cam members are shifted in their positions from each other for two cam members between two hard disks, for example, the distance between both the cam members can be reduced, resulting in the shorter distance between the hard disks and hence the smaller size of the apparatus.

Figure 13:
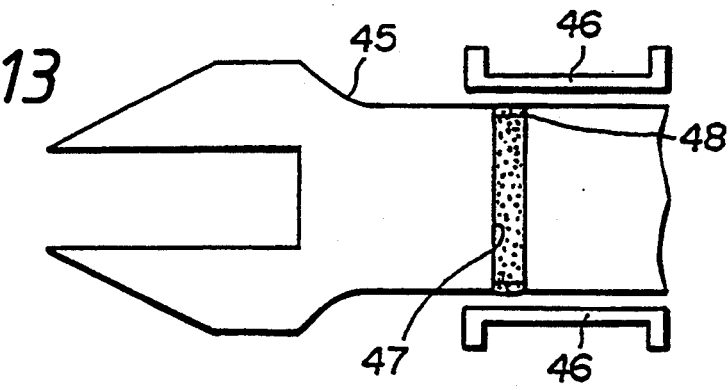
FIG. 13 is an explanatory view showing a cam member of a recording/playback apparatus according to a sixth embodiment of the present invention.

A sixth embodiment of the recording/playback apparatus according to the present invention will be described with reference to FIG. 13.

It is required for the cam member of the type mentioned above to be coated on its surface with a lubricant for the purpose of improving wear resistance. However, some lubricants that generate a small amount of gas are disadvantageous in having small viscosity and short lifetime.

In the sixth embodiment, therefore, a lubricant holding groove 47 is provided in an area of a cam member 45 near its base, i.e., in a position where a load arm 4 is stopped after the retracting operation. Since a lubricant 48 is always reserved in the lubricant holding groove 47 with a capillary action, the lubricant is supplied between the load arm 46 and the cam member 45 each time the load arm 46 slides over the lubricant holding groove 47.

Figure 14:
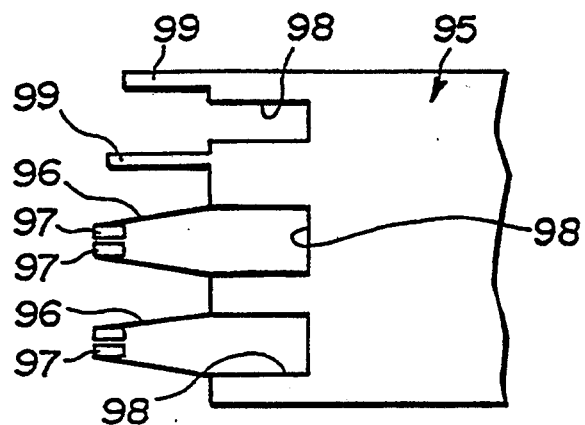
FIG. 14 is an explanatory view showing a head base of a recording/playback apparatus according to a seventh embodiment of the present invention.
Figure 15:
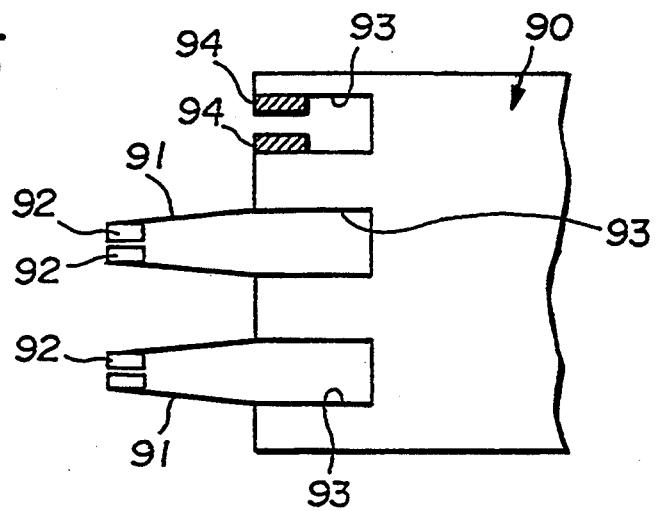
FIG. 15 is an explanatory view showing a head base of prior art for comparison with the seventh embodiment shown in FIG. 14.
Figure 16A:
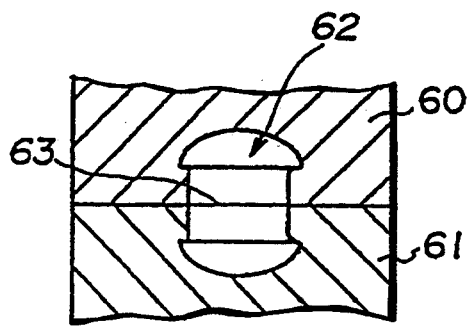
FIGS. 16(a) and 16(b) are, respectively, an explanatory view showing a mold for molding a cam member of prior art for one disk and a front view of the cam member for one disk molded by using the above mold.
Figure 16B:
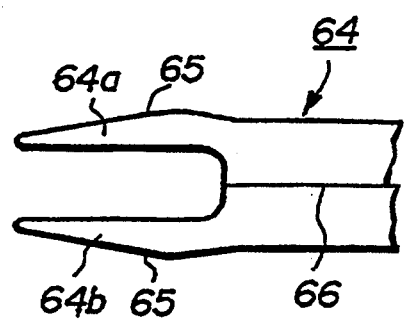
Figure 16C:
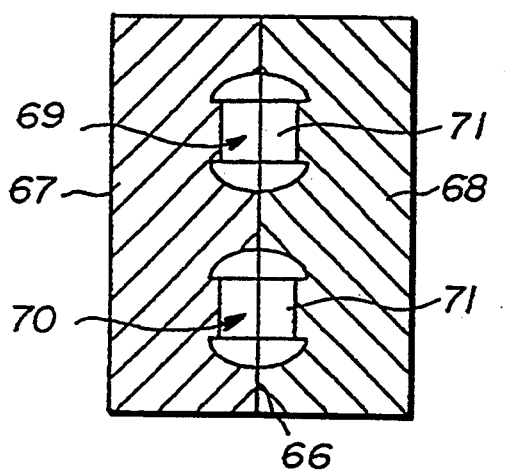
FIGS. 16(c) and 16(d) are, respectively, an explanatory view showing a mold for molding a cam member of prior art for two disks and a front view of the cam member for two disks molded by using the above mold.
Figure 16D:
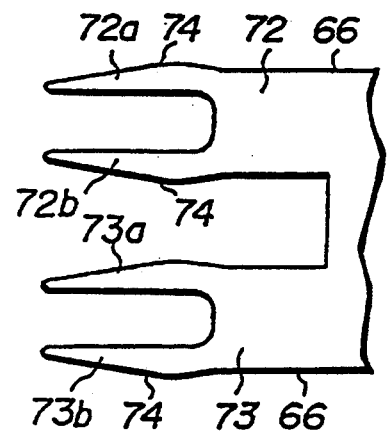
Figure 17:
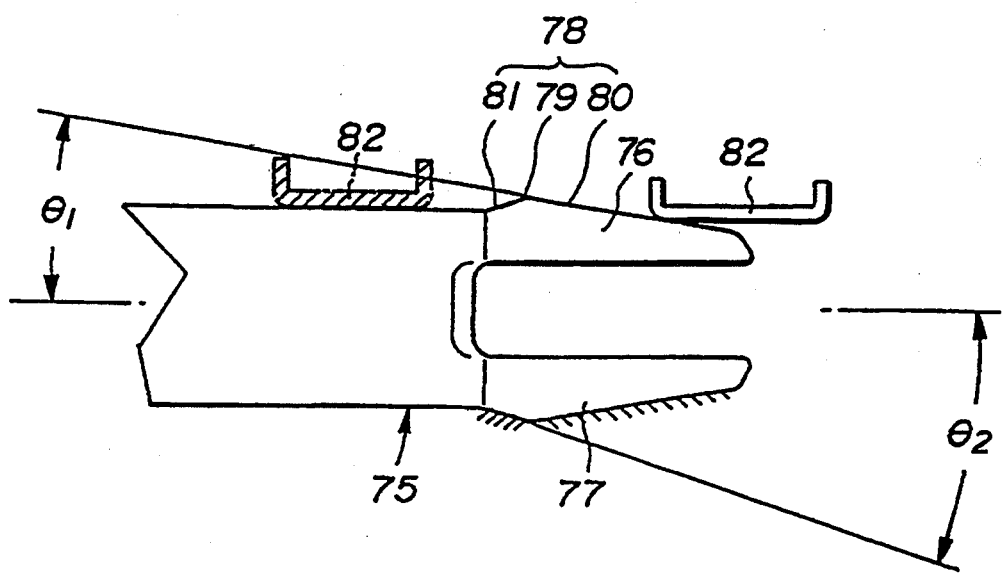
FIG. 17 is an explanatory view showing essential parts of a cam member of prior art.

A seventh embodiment of the recording/playback apparatus according to the present invention will be described with reference to FIGS. 14 and 15.

A head base of a magnetic disk drive of prior art will first be described. Referring to FIG. 15, denoted by 90 is a head base, 91 is a load arm, 92 is a magnetic head attached to a distal end of the load arm 91 through a flexure, 93 is a recessed mount portion to which the load arm 91 is mounted, and 94 is a counterweight.

In this type magnetic disk drive, a drive using a plurality of hard disks is produced as a main model. Then, an increase in variety of products or a retrofit of outdated products is achieved by removing one or more hard disks from the main model to manufacture drives of smaller capacity. After removing one or more hard disks 1, the counterweight 94 has been conventionally attached to the spare mount portion 93 of the head base 90 for keeping swing arms comprised of load arms and so on well balanced. With such a structure, the counterweight 94 had to be prepared as a separate member and a step of attaching the counterweight 94 was additionally required.

In the seventh embodiment, therefore, the head base is fabricated with the counterweight originally attached thereto and a part of the counterweight is cut away corresponding to the number of hard disks used. This enables a reduction in the part cost and a cut-down in the number of steps. Referring to FIG. 14, denoted by 95 is a head base, 96 is a load arm, 97 is a magnetic head attached to a distal end of the load arm 97 through a flexure, 98 is a recessed mount portion which is provided in the head base 95 and to which the load arm 96 is mounted, and 99 is a counterweight integrally molded with the head base 95.

What is claimed is:

1. A recording/playback apparatus comprising:
   a chassis;
   a disk rotatably connected to the chassis, the disk having a recording surface and having an outer edge;
   a support member pivotally connected to the chassis, the support member including a base and a load arm having a fixed end connected to the base, the load arm also having a free end;
   a transducer connected to the free end of the load arm;
   means for pivoting the support member such that the transducer moves over the recording surface of the disk;
   driving means for driving the pivoting means such that the transducer is retracted toward the outer edge of the disk; and a cam member fixedly connected to the chassis adjacent the disk, the cam member including an arcuate side surface, a flat side surface, an upper surface and a lower surface;

wherein the arcuate side surface is positioned to contact the load arm when the transducer is retracted such that load arm slides along the arcuate side surface and is supported by the upper surface, thereby separating the transducer from the recording surface; and wherein the flat side surface is formed opposite the arcuate side surface.

2. A recording/playback apparatus comprising:

a chassis;

a disk rotatably connected to the chassis, the disk having a recording surface and having an outer edge;

a support member pivotally connected to the chassis, the support member including a base and a load arm having a fixed end connected to the base, the load arm also having a free end;

a transducer connected to the free end of the load arm;

means for pivoting the support member such that the transducer moves over the recording surface of the disk;

driving means for driving the pivoting means such that the transducer is retracted toward the outer edge of the disk; and a cam member fixedly connected to the chassis adjacent the disk, the cam member including a upper cam surface positioned to contact the load arm when the transducer is retracted such that the load arm slides along the cam surface, thereby separating the transducer from the recording surface;

wherein the upper cam surface includes an upwardly-sloped portion and a downwardly-sloped portion meeting at a rounded peak portion; and wherein a slope of the upwardly-sloped portion is equal to a slope of the downwardly-sloped portion.

3. A recording/playback apparatus comprising:

a chassis;

a disk rotatably connected to the chassis, the disk having two recording surfaces and having an outer edge;

a support member pivotally connected to the chassis, the support member including a base, a first load arm having a first fixed end connected to the base and a first free end, and a second load arm having a second fixed end connected to the base and a second free end;

first and second transducers respectively connected to the first and second free ends;

means for pivoting the support member such that the first and second transducers move over the recording surfaces of the disk;

driving means for driving the pivoting means such that the first and second transducers are retracted toward the outer edge of the disk; and first and second cam members fixedly connected to the chassis adjacent the disk, each of the first and second cam members being formed with a cam surface positioned to respectively contact the first and second load arms when the first and second transducers are retracted such that the first and second load arms slide along the cam surfaces, thereby separating the first and second transducers from the recording surfaces of the first and second disks;

wherein the cam surface of the first cam member includes a first front edge and a first sloped portion extending from the first front edge to a first peak portion, and the cam surface of the second cam member includes a second front edge and a second sloped portion extending from the second front edge to a second peak portion; and wherein a distance from the first front edge to the first peak portion is different than a distance from the second front edge to the second peak portion, so that the first sloped portion has a different slope-rate than the second sloped portion.

* * * * *